United States Patent [19]

Ishikawa

[11] Patent Number: 4,768,092
[45] Date of Patent: Aug. 30, 1988

[54] IMAGE SIGNAL CONVERSION DEVICE
[75] Inventor: Hisashi Ishikawa, Kanagawa, Japan
[73] Assignee: Canon Kabushiki Kaisha, Tokyo, Japan
[21] Appl. No.: 76,132
[22] Filed: Jul. 21, 1987
[30] Foreign Application Priority Data Jul. 23, 1986 [JP] Japan ................................. 61-173434
Jul. 23, 1986 [JP] Japan ................................. 61-173435
Jul. 23, 1986 [JP] Japan ................................. 61-173436
Jul. 23, 1986 [JP] Japan ................................. 61-173437

[51] Int. Cl.$^4$ ............................................ H04N 7/01
[52] U.S. Cl. .................................... 358/140; 358/105;
358/136; 358/135
[58] Field of Search ................. 358/140, 11, 105, 136, 358/135

[56] References Cited
U.S. PATENT DOCUMENTS

| 3,715,483 | 2/1973 | Limb | 358/135 |
| 4,658,293 | 4/1987 | Arai | 358/105 |
| 4,661,850 | 4/1987 | Strolle | 358/140 |
| 4,672,445 | 6/1987 | Casey | 358/140 |
| 4,679,084 | 7/1987 | Topper | 358/105 |

Primary Examiner—Howard W. Britton
Attorney, Agent, or Firm—Robin, Blecker & Daley

[57] ABSTRACT

An image signal conversion device for handling an interlaced image signal whereby one frame picture plane is formed by multiplexing, in an alternately time sharing manner, odd- and even-number field image signals which form the interlaced image signal and respectively correspond to odd- and even-number field picture planes consisting of horizontal scanning lines alternately located on a picture plane is arranged to form a high resolution image signal by increasing the number of horizontal scanning line signals forming each of said field image signals in the following manner: A given field image signal within the interlaced image signal is assumed to be a first field image signal; an inner-field interpolation signal for the first field image signal is formed by using the first field image signal; an inter-field interpolation signal for the first field image signal is formed by using at least a second field image signal which is received immediately before the first field image signal; either the inner-field interpolation signal or the inter-field interpolation signal is selected for the interlaced signal by using at least the first and second field image signals; and a high solution image signal is obtained with the number of the horizontal scanning line signals increased for each of the field image signals by carrying out interpolation using the interpolation signal selected.

26 Claims, 8 Drawing Sheets

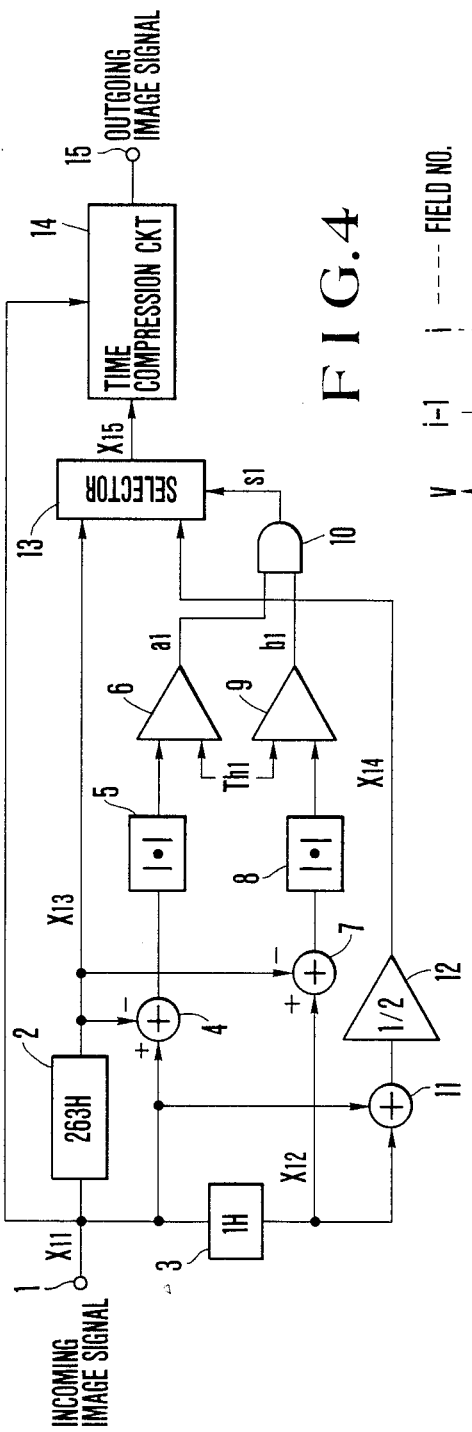
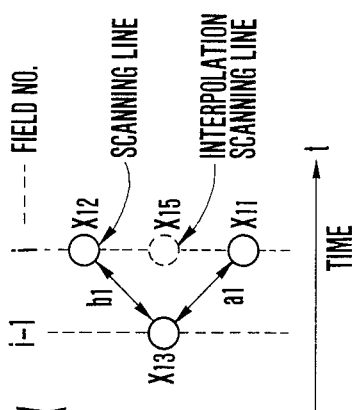
FIG.3
FIG.4

| S21 | S22 | INTERPOLATION SIGNAL X27 |
|-----|-----|--------------------------|
| L | L | (X21+X24)/2 |
| L | H | X24 |
| H | L | X21 |
| H | H | (X22+X23)/2 |

IMAGE SIGNAL CONVERSION DEVICE

BACKGROUND OF THE INVENTION

1. Field of the Invention

This invention relates to an image signal conversion device for forming a high resolution image signal by increasing the number of horizontal scanning line signals of such an image signal as a TV signal that consists of a plurality of horizontal scanning line signals.

2. Description of the Related Art

A non-interlacing method of increasing, for example, by two times the number of scanning lines of one field has been proposed for obtaining an image signal of a high degree of definition from a video signal which is obtained by the interlacing method presently employed in general, such as in the NTSC color system.

The attempt to double the number of scanning lines encounters a problem as to how to create an interpolating signal in between one scanning line and another. In respect of this, for example, a method of selecting inner-field interpolation whereby an average value of two adjacent lines within one and the same field is used as the interpolating signal or inter-field interpolation whereby a corresponding signal within another field is used as the interpolating signal as it is according to the movement of the image. It is important for this method to accurately detect the movement of the image of an object as the picture quality thus obtained depends on the detection accuracy. Generally, a discrimination between a movement or no movement is made according to occurrence or nonoccurrence of any significant difference in a signal showing a difference between a present field and a preceding or ensuing field (representing a frame difference or a difference between frames). However, in accordance with this method, there arises no significant difference on some occasion in the difference signal between the present field and the preceding or ensuing field while the present field has a move. On that occasion, there arises conspicuous deterioration in picture quality such as a double image or the like.

FIGS. 1 and 2 of the accompanying drawings show such picture quality deterioration. In FIG. 1, positions (1) to (6) respectively correspond to positions (1) to (6) shown in FIG. 2. In both the drawings FIGS. 1 and 2, hatched parts indicate selection of the inner-field interpolation. Let us assume that an object image which is shown with a thick line and is at rest in a position (2) within a field $i-1$ comes to move from an area (iii) to an area (i) within another field i and then comes to a stop in a position (4) within a field $i+1$. In this instance, if movement detection is performed by the medium of a difference signal between the present field and a preceding or ensuing field, at the areas (i) and (iii) of the field i of FIG. 1, there arises a significant difference in the frame difference of the areas (i) and (iii) shown in FIG. 2. Therefore, the inner-field Meanwhile, interpolation is selected in this instance. There arises no significant difference in the frame difference of an area (ii). Therefore, although this area has the movement, the inter-field interpolation is selected for the area. Then, the area (ii) of FIG. 1 is interpolated with a signal representing the background image of the preceding field. As a result of this, there arises a disturbance by a double image.

Further, it is only the field i that has a move. Meanwhile, the fields $i-1$ and $i+1$ are at rest. Under the condition, inter-field interpolation is applicable. However, in accordance with the method of detecting movement through the frame difference, it is impossible to determine a field having occurrence of a move. Therefore, the inner-field interpolation is selected for the fields $i-1$ and $i+1$. This results in an unnatural (blurred) picture of a moving object having low resolution images before and after it.

SUMMARY OF THE INVENTION

This invention is directed to the solution of the above stated problem of the prior art.

It is therefore an object of this invention to provide an image signal conversion device which is capable of forming a high resolution image signal with simple arrangement and without being disturbed by occurrence of a double image.

Under this object an image signal conversion device of the kind handling an interlaced image signal, whereby one frame picture plane is formed by multiplexing in a time sharing manner a plurality of field image signals corresponding to a plurality of field picture planes consisting of horizontal scanning lines located in different positions from each other on a picture plane, is arranged as an embodiment of this invention to form the image signal in a state of having high resolution by increasing the number of horizontal scanning line signals constituting each of the field image signals, the device comprising: inner-field interpolation signal forming means arranged to receive the interlaced image signal and with a given field image signal of the interlaced image signal assumed to be a first field image signal, to use the first field image signal for forming an inner-field interpolation signal for the first field image signal; inter-field interpolation signal forming means arranged to receive the interlaced image signal and to form an inter-field interpolation signal for the first field image signal by using at least a second field image signal which is received prior to the first field image signal within the interlaced image signal and is adjacent to the first field image signal; selective output means arranged to select and produce either the inner-field interpolation signal formed by the inner-field interpolation signal forming means or the inter-field interpolation signal formed by the inter-field interpolation signal forming means; control means for controlling the selective output means by using at least the first and second field image signals; and image signal forming means for forming a high resolution image signal by interpolating the interlaced image signal with the interpolation signal produced from the selective output means.

It is another object of this invention to provide an image signal conversion device which is capable of giving by simple arrangement a high resolution image free from any blurred image that follows the image of a moving object image.

Under that object, an image signal conversion device of the kind handling an interlaced image signal, whereby one frame picture plane is formed by multiplexing, in an alternately time sharing manner, odd- and even-number field image signals which form the interlaced image signal and respectively correspond to odd- and even-number field picture planes consisting of horizontal scanning lines alternately located on a picture plane, is arranged as an embodiment of this invention to form the image signal in a state of having high resolution by increasing the number of horizontal scanning line signals constituting each of the field image signals, the device comprising: inner-field interpolation signal forming means arranged to receive the interlaced image signal and, with a given field image signal of the interlaced image signal assumed to be a first field image signal, to use the first field image signal for forming an inner-field interpolation signal for the first field image signal; inter-field interpolation signal forming means arranged to receive the interlaced image signal and to form an inter-field interpolation signal for the first field image signal by using at least one field length of a second field image signal which has horizontal scanning lines in different positions on a corresponding image plane from the first field image signal; selective output means arranged to select and produce either the inner-field interpolation signal formed by the inner-field interpolation signal forming means or the inter-field interpolation signal formed by the inter-field interpolation signal forming means; control means for controlling the selective output means by using at least the first and second field image signals; and image signal forming means for forming a high resolution image signal by interpolating the interlaced image signal with the interpolation signal produced from the selective output means.

It is a further object of this invention to provide an image signal conversion device which is capable of forming a high resolution image signal without any erroneous action even in the event of a moving image and without deteriorating picture quality.

Under this object, an image signal conversion device of the kind handling an interlaced image signal, whereby one frame picture plane is formed by multiplexing, in an alternately time sharing manner, odd-number and even-number field image signals which form the interlaced image signal and respectively correspond to odd- and even-number field picture planes consisting of horizontal scanning lines alternately located on each picture plane, is arranged as an embodiment of this invention to form the image signal in a state of having high resolution by increasing the number of horizontal scanning line signals constituting each of the field image signals, the device comprising: inner field interpolation signal forming means arranged to receive the interlaced image signal, to use, as a first field image signal, a field image signal portion of the interlaced image signal received one frame period before a presently received field image signal portion for forming an inner-field interpolation signal for the first field image signal; inter-field interpolation signal forming means arranged to receive the interlaced image signal and to form an inter-field interpolation signal for the first field image signal by using a second field image signal which has horizontal scanning lines in different positions on a corresponding image plane from the first field image signal; selective output means arranged to select and produce either the inner-field interpolation signal formed by the inner-field interpolation signal forming means or the inter-field interpolation signal formed by the inter-field interpolation signal forming means; control means for controlling the selective output means by using at least the first and second field image signals; and image signal forming means for forming a high resolution image signal by interpolating the interlaced image signal with the interpolation signal produced from the selective output means.

Other objects and features of the invention will become apparent from the following detailed description of embodiments thereof taken in connection with the accompanying drawings.

BRIEF DESCRIPTION OF THE DRAWINGS

FIG. 3 is a block diagram showing a first embodiment of this invention. FIG. 4 shows a relation obtained by the first embodiment among field difference determining signals a1 and b1, image signals X11, X12 and X13 and an interpolation signal X15.

DETAILED DESCRIPTION OF PREFERRED EMBODIMENTS

Figure 1:
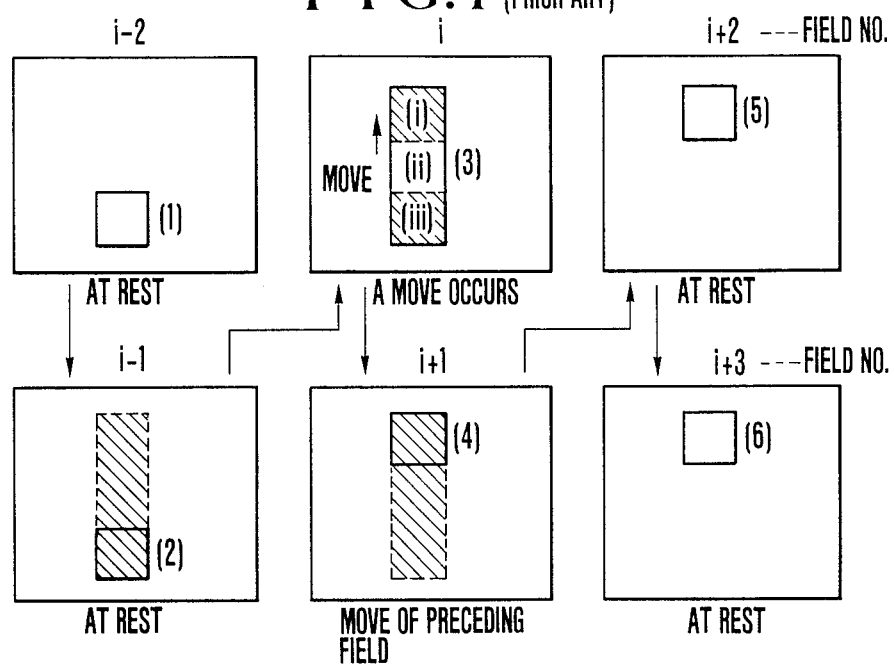
FIGS. 1 and 2 illustrate an interpolation signal selecting method of the conventional image signal conversion device and the effect attainable thereby.
Figure 2:
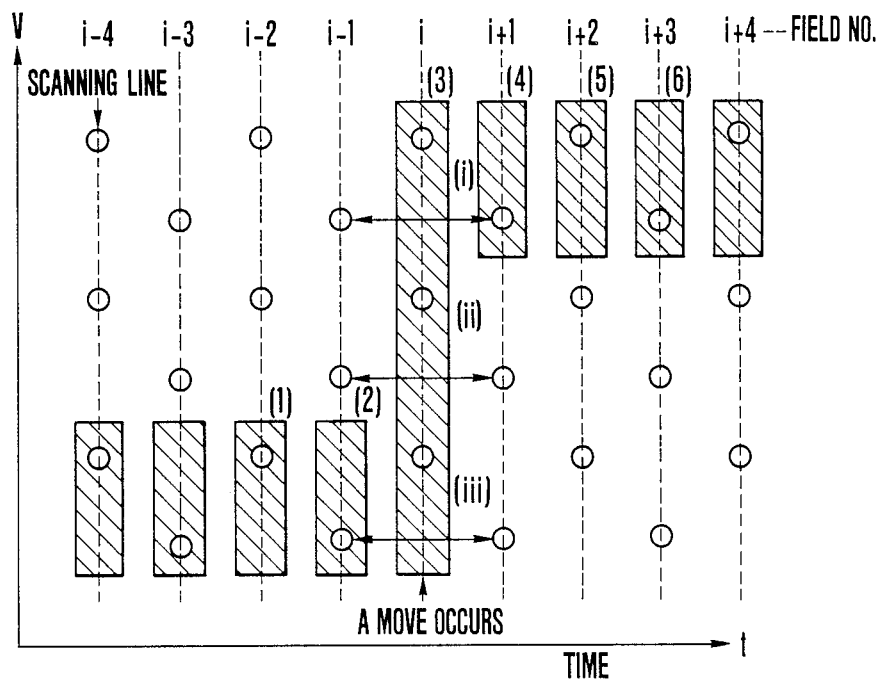

Embodiments of this invention are described below with reference to the accompanying drawings on the assumption that an incoming image signal is arranged to form one picture frame with 525 lines:

FIG. 3 shows in a block diagram a first embodiment of the invention. The incoming image signal X11 which is received at an input terminal 1 is delayed to a degree corresponding to one field (more specifically, corresponding to 263 lines) by a field memory 2. The incoming image signal is further delayed as much as one line by a line memory 3. The output of the line memory 3 is assumed to be X12 and that of the field memory to be X13. A subtracter 4 is arranged to perform a subtracting operation on the incoming image signal X11 and an image signal X13 which precedes the signal X11 by a degree corresponding to 263 lines (to obtain a lower field difference). An absolute value circuit 5 is arranged to obtain the output of the subtracter 4 and to supply it to a comparison circuit 6. Another subtracter 7 is arranged to perform a subtracting operation on the signals X13 and X12 (to obtain an upper field difference). Another absolute value circuit 8 is arranged to obtain the output of the subtracter 7 and to supply it to a comparison circuit 9. The comparison circuits 6 and 9 are arranged to compare their inputs with a threshold value Th1 and to produce difference determining signals a1 and b1 at a high level when the input is higher than the threshold value Th1 and at a low level when the former is lower than the latter. An AND circuit 10 is arranged to obtain a logical product from the outputs a1 and b1 of the comparison circuits 6 and 9 and to produce an interpolation selection signal S1. FIG. 4 shows the relation of image signals X11, X12 and X13 to difference determining signals a1 and b1 between the field i to be interpolated and the preceding field i−1. In FIG. 4, the axis of ordinate indicates the vertical direction on the picture plane and the axis of abscissa the time.

An adder 11 is arranged to add the image signal X12 to the image signal X11. A ½ coefficient multiplying circuit 12 is arranged to multiply the sum by ½ to obtain an inner-field interpolation signal X14. The signal X14 is supplied to a selector 13. This interpolation signal X14 represents an average value of the scanning lines located above and below the scanning line for which the signal is to be interpolated. The selector 13 receives also an image signal X13 of the preceding field i−1 and an interpolation selection signal S1, which is applied as a control signal to the selector from an AND circuit 10. The selector 13 selects the interpolation signal X14 when this interpolation selection signal S1 is at a high (H) level and the interpolation signal X13 when the signal S1 is at a low (L) level. The interpolation signal thus selected is supplied to a time compression circuit 14. The circuit 14 is arranged to receive also the incoming image signal X11 from the input terminal 1 and to compress to ½ the time base of each of the input signal X11 and the interpolation signal X15 from the selector 13. The time base compressed signals are then supplied from the circuit 14 to an output terminal 15 in rotation in the order of signals X12, X15 and X11.

The circuit of FIG. 3 operates as follows: Referring to FIG. 4, in the event of occurrence of a move in the field i−1, a temporal correlation between the field i and another field i−1 is not strong. In that event, both the absolute value of X11−X13 and that of X12−X13 are larger than a threshold value Th. The levels of both the difference determining signals a1 and b1 are then high (H) The level of the interpolation selection signal (movement signal) S1 also becomes an H level and the inner-field interpolation signal X14 is selected.

Further, in case that the field i−1 is at rest, the signal X13 has a strong correlation with either the signal S11 or the signal X12 even if there is some image edge between the signals X12 and X11. Therefore, the level of either the difference determining signal a1 or b1 becomes low (L). The level of the interpolation selection signal S1 thus becomes L. The selector 13 then supplies the inter-field interpolation signal X13 to the time compression circuit 14.

While a memory for 263 lines is employed as the field memory 2 of the first embodiment, this memory arrangement may be changed to divide the field memory into a memory for one line and a memory for 262 lines and to obtain the signal X12 from the output of the one line memory. In that event, the line memory 3 can be omitted. Further, it goes without saying that the memories 2 and 3 may be replaced with delay circuits of delay time lengths corresponding to the memories 2 and 3. Further, in this embodiment, the signal of a field preceding the interpolating field is employed a the inter-field interpolation signal. However, the signal of a field ensuing the interpolating field may be used for that purpose instead of using that of the preceding field.

As obvious from the foregoing description, the first embodiment is capable of performing scanning line conversion for obtaining a picture of a high degree of definition free from any double image disturbance. Further, the arrangement to detect the move of an image through a difference between fields enables the memory capacity to be only for one field at the most. The embodiment thus permits reduction in size and cost of the circuit.

Figure 5:
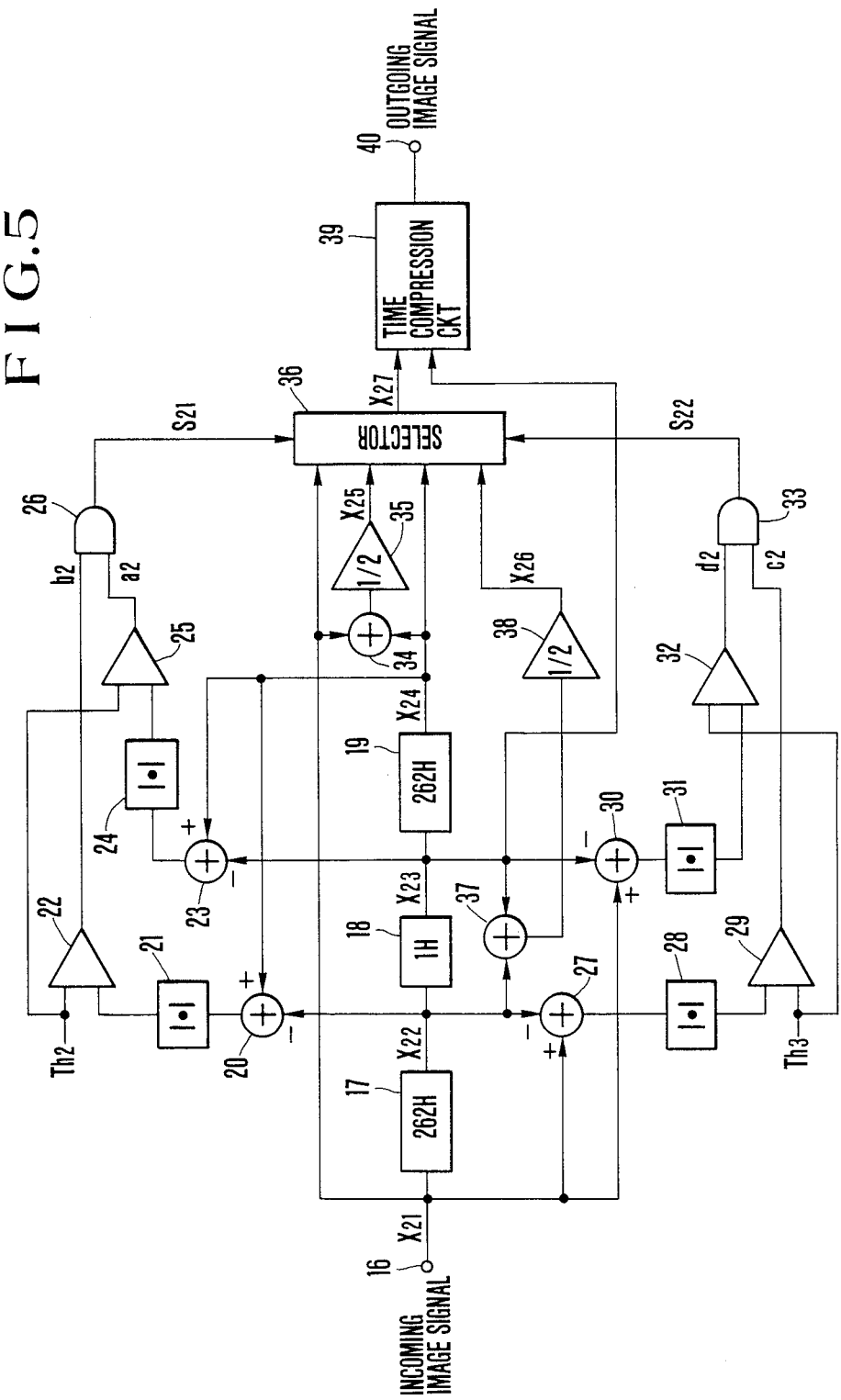
FIG. 5 is a block diagram showing a second embodiment of this invention.

A second embodiment of this invention is arranged as follows: FIG. 5 shows the second embodiment in a block diagram. An image signal X21 which is received at an input terminal 16 is delayed by a field memory 17, a line memory 18 and a field memory 19 to degrees corresponding to 262 lines, one line and 262 lines respectively. The signal output of the field memory 17 is assumed to be X22, that of the line memory 18 to be X23 and that of the field memory 19 to be X24.

A subtracter 20 is arranged to perform a subtracting operation on the signal X22 and the image signal X24 which is received 263 lines before the signal X22. An absolute value circuit 21 is arranged to obtain the absolute value of the output of the subtracter 20 and supplies it to a comparison circuit 22. Another subtracter 23 is arranged to perform a subtracting operation on the image signal X23 and the image signal X24 received one field (262 lines in actuality) before the signal X23. Another absolute value circuit 24 obtains the absolute value of the output of the subtracter 23 and supplies it to another comparison circuit 25. Each of the comparison circuits 22 and 25 is arranged to compare this input with a threshold value Th2. They produce difference determining signals b2 and a2 at an H level when their inputs are larger than the threshold value Th2 and at an L level when their inputs are less than the threshold value Th2. An AND circuit 26 is arranged to obtain a logical product from the outputs b2 and a2 of the comparison circuits 22 and 25. The logical product is then produced as an interpolation selection signal S21.

A subtracter 27 is arranged to perform a subtracting operation on the image signal X21 and the image signal X22 which is received one field (262 lines to be exact) before the image signal X21. An absolute value circuit 28 is arranged to obtain the absolute value of the output of the subtracter 27 and to supply it to a comparison circuit 29. Another subtracter 30 is arranged to perform a subtracting operation on the image signal X21 and the image signal X23 which is received one field (or 263 lines to be exact) before the image signal X21. An absolute value circuit 31 is arranged to obtain the absolute value of the output of the subtracter 30 and to supply it to a comparison circuit 32. The comparison circuits 29 and 32 compare their inputs with a threshold value Th3. They produce difference determining signals c2 and d2 at an H level when the inputs are larger than the threshold value Th3 and at an L level when the inputs are less than the threshold value. The input sides on which the threshold value Th3 is supplied to the comparison circuits 29 and 32 are arranged to be contrary to each other. An AND circuit 33 is arranged to obtain a logical product from the outputs c2 and d2 of the comparison circuits 29 and 32 and to produce an interpolation selection signal S22.

An adder 34 is arranged to add the image signal X24 to the image signal X21. The sum of them thus obtained is supplied to a ½ coefficient multiplying circuit 35. The circuit 35 multiplies the sum by ½ to obtain an inter-field interpolation signal X25 (representing the average value of the preceding and ensuing fields). The signal X25 is supplied to the selector 36. Another adder 37 is arranged to add the image signal X23 to the image signal X22. The sum of the signals X22 and X23 thus obtained is multiplied by ½ by a ½ coefficient multiplying circuit 38. The circuit 38 thus obtains an inner-field interpolation signal X26, which is then supplied also to the selector 36. Meanwhile, the selector 36 receives the image signal X24 which is obtained by delaying the incoming image signal X21 to a degree corresponding to one frame (or 525 lines) and also interpolation selection signals S21 and S22 which are supplied as control signals.

Figures 6, 9:
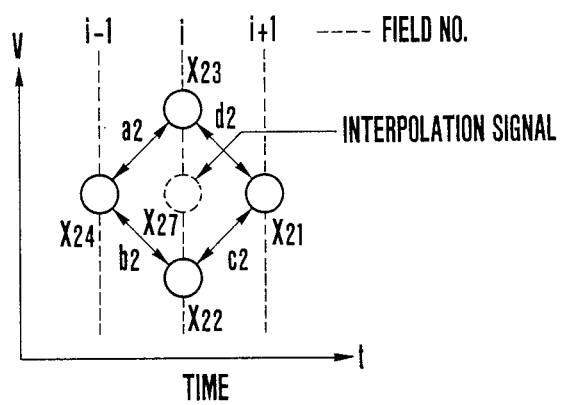
FIG. 6 shows a relation obtained by the second embodiment between field difference determining signals a2, b2, c2 and d2 and image signals X21, X22, X23 and X24.
FIG. 9 shows interpolation selection signals S21 and S22 of the second embodiment in relation to a selected interpolation signal X27.

In accordance with these interpolation selection signals S21 and S22, the selector 36 selects one of the four interpolation signals and supplies it to a time compression circuit 39. FIG. 9 shows the interpolation signals S21 and S22 in relation to the interpolation signal X27 which is thus selected. The time compression circuit 39 is arranged to compress to ½ the time base of the original signal X23 and that of the interpolation signal X27 produced from the selector 36 and supplies them alternately to an output terminal 40.

Referring to FIG. 6 which show the relation of the image signals X21, X22, X23 and X24 to the difference determining signals a2, b2, c2 and d2 as obtained between consecutive fields, the circuit of FIG. 5 operates as follows: The difference determining signals a2, b2, c2 and d2 and the image signals X21, X22, X23 and X24 shown in FIG. 6 respectively correspond to the difference determining signals a2, b2, c2 and d2 and the image signals X21, X22, X23 and X24 which are shown in FIG. 5. The axis of ordinate of FIG. 6 indicates the vertical direction on the picture plane and the axis of abscissa the time. Therefore, signals vertically aligned in the drawing are within one and the same field. The interpolation signal to be used in between the image signals X22 and X23 of the field i is selected as follows:

A movement in the field i+1 saliently deprives the fields i and i+1 of correlativity between them. The absolute value of (X21−X22) then becomes larger than the threshold value Th3. A level of the difference determining signal c2 becomes H. The absolute value of (X21−X23) also comes to exceed the threshold value Th3. The level of the difference determining signal d2 also becomes H (high). As a result, the level of the interpolation selection signal S22 becomes H. If both the fields i−1 and i are at rest, there is a strong correlativity between them. In this case, eve if there is any image edge between the image signals X22 and X23, either the absolute value or (X24−X22) or that of (X24−X23) must be less than the threshold value Th2. Therefore, the level of the interpolation selection signal S21 becomes L(low). Accordingly, as shown in FIG. 9, the selector 36 produces the signal S24 as the interpolation signal X27.

In case that there is a move in the field i−1 while other fields i and i+1 are at rest, the level of the signal S21 becomes H and that of the signal S22 L. The selector 36 then comes to produce the image signal X21 as the interpolation signal X27.

If all the fields i−1, i and i+1 are at rest, a strong correlativity obtains among the fields. The levels of both the interpolation selection signals S21 and S22 become L. The selector 36 then produces the average value (X21 +X24) / 2 of the preceding and ensuing fields as the interpolation signal X27.

In the event of a move in the field i, the correlativity is weak both between the the field i−1 and i and between the fields i and i+1. Therefore, in that event, the levels of all the difference determining signals a2, b2, c2 and d2 become H. The levels of both the interpolation selection signals S21 and S22 become H. The selector 36 comes to produce an average value signal (X22 +X23) / 2 as the interpolation signal X27 for inner-field interpolation.

Figure 7:
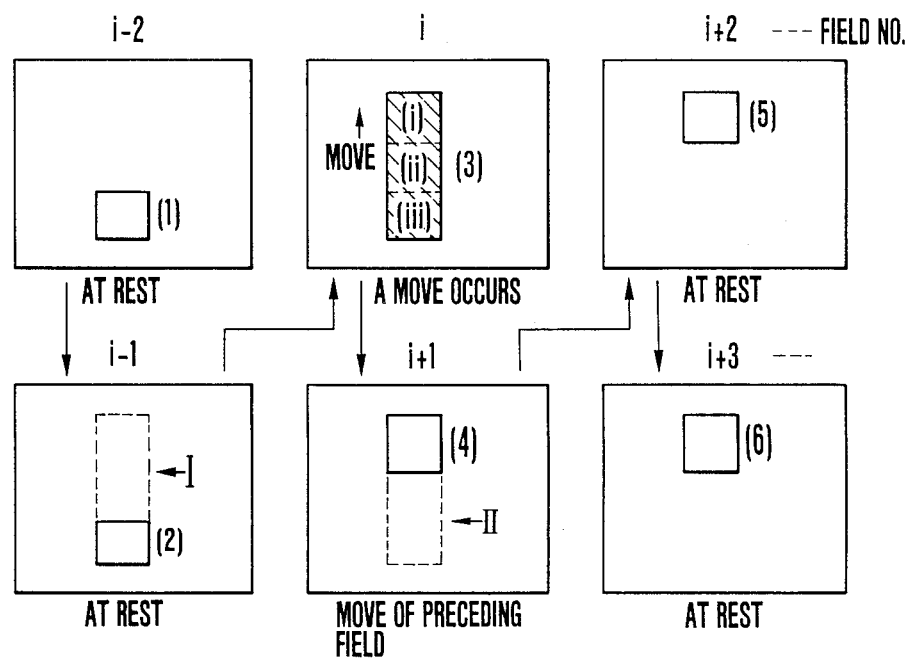
FIG. 7 shows on a picture plane the interpolating operation of the second embodiment on a moving image.
Figure 8:
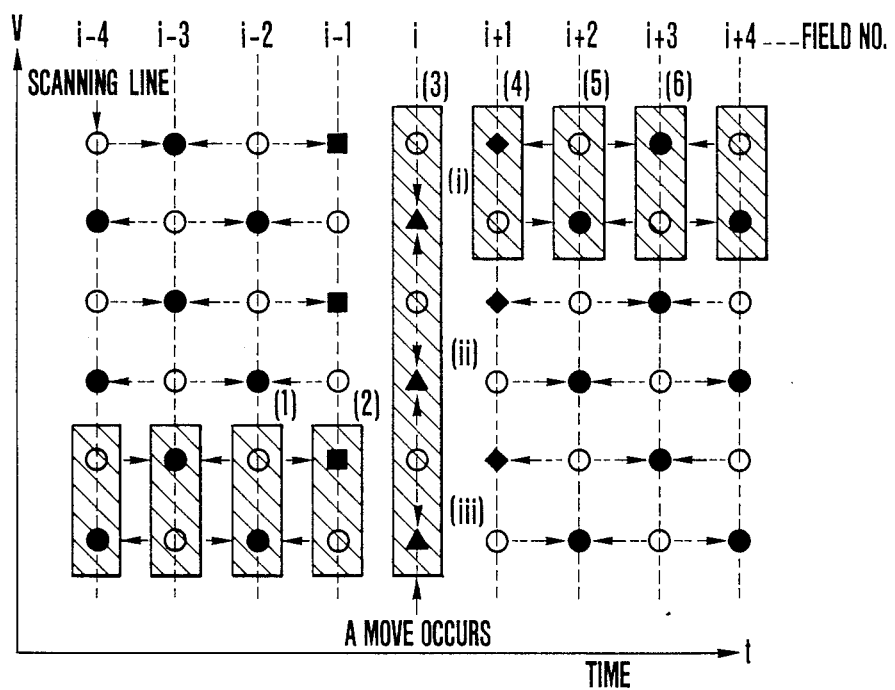
FIG. 8 shows the selecting action of the second embodiment on interpolation signals.

In the case of this embodiment, pictures are displayed on a picture plane as shown in FIG. 7. The details of interpolation to be effected in between consecutive fields are as shown in FIG. 8. In FIG. 7, a hatched part represents an inner-field interpolation area. A reference symbol I denotes a part for which an interpolation signal is obtained from the preceding field. A symbol II denotes a part for which an interpolation signal is obtained from the ensuing field. In FIG. 8, marks o denote ordinary scanning line signals; black triangle marks denote interpolation by inner-field signals; black circular marks denote interpolation by an average value of signals of preceding and ensuing fields; black square marks denote interpolation by the signal of the preceding field; and black rhombus marks denote interpolation by the signal of the ensuing field. Further, in FIG. 8, arrows indicate scanning line signals to be employed as the interpolation signals.

As obvious from FIG. 7, in this specific embodiment, the inner-field interpolation is selected only for the field i in which a move has occurred. Further, there arises no such double image disturbance that is stated in the foregoing with reference to FIG. 1. Further, as obvious from FIG. 8, if no move takes place within three consecutive fields, interpolation for the middle field is effected by the average value of the preceding and ensuing fields. Interpolation by an average value improves S/N ratio of the signal and thus results in an improved S/N ratio of the whole image. Generally, an image signal consists of stationary areas. Therefore, the interpolation by the average value of preceding and ensuing fields is quite advantageous.

As obvious from the foregoing description, the second embodiment is capable of removing any low resolution image that follows the image of a moving object and carries out scanning line conversion without deteriorating the edge parts of the image and causes no double image.

Figure 10:
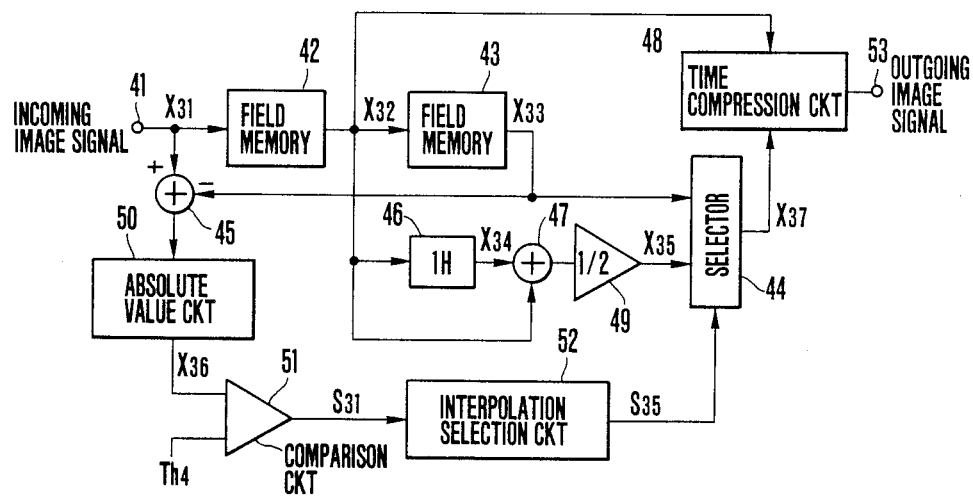
FIG. 10 is a block diagram showing a third embodiment of this invention.

A third embodiment of this invention is arranged as described below with reference to applicable drawings:

FIG. 10 shows the third embodiment in a block diagram. An incoming image signal X31 which is received at an input terminal 41 is delayed to a degree corresponding to one frame by field memories 42 and 43 before and is then supplied to a selector 44 and a subtracter 45. Further, the field memory 42 produces a one-field delayed signal X32, which is supplied to a line memory 46, to an adder 47 and to a time compression circuit 48. The line memory 46 delays the input signal to a degree corresponding to one line to obtain a signal X34. The signal X34 is supplied also to the adder 47. The adder 47 then obtains the sum of upper and lower lines located above and below an interpolating scanning line. The sum is multiplied by ½ at ½ coefficient multiplying circuit 49 to obtain an inner-field interpolation signal X35. The signal X35 is supplied to the selector 44. A difference between the signal X31 and a signal X33 received one frame before is obtained by the subtracter 45. A difference signal thus obtained is supplied to an absolute value circuit 50 to be converted into an absolute value signal X36 representing a frame difference. The signal X36 is supplied to a comparison circuit 51.

The comparison circuit 51 compares the frame difference absolute value X36 with a threshold value Th4.

The circuit 51 supplies to an interpolation selection circuit 52 with a movement signal S31 at a high (H) level when the frame difference absolute value X36 is larger than the threshold value Th4 and at a low (L) level when the former is not exceeding the threshold value. The interpolation selection circuit 52 is arranged to cancel any movement signal that causes a double image disturbance or a blur following the image of a moving object and to supply the selector 44 with an interpolation selection signal S35 which does not cause such disturbance. In accordance with this interpolation selection signal S35, the selector 44 selects and produces either an inter-field interpolation signal X33 or an inner-field interpolation signal X35 to a time compression circuit 48 as an interpolation signal X37. The time compression circuit 48 is arranged to compress to ½ the time bases of the original signal X32 and the interpolation signal X37 and supplies them alternately to an output terminal 53.

Figure 11:
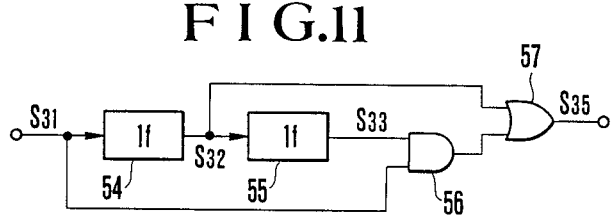
FIG. 11 shows by way of example the details of an interpolation selection circuit included in the third embodiment.

FIG. 11 shows by way of example the details of arrangement of the interpolation selection circuit 52 of FIG. 10. With the movement signal S31 supplied to the interpolation selection circuit 52, one-field delay circuits 54 and 55 delay the signal S31 by one field respectively to produce a signal S33 which is thus delayed by two fields (or one frame). An AND circuit 56 is arranged to obtain a logical product from the movement signal S31 and the two-field delayed signal S33. An OR circuit 57 is arranged to obtain a logical sum from a signal S32 which is delayed one field by the delay circuit 54 and the output of the AND circuit 56 and thus produce an interpolation selection signal S35. Any blurred image preceding a moving object's image is removed by the AND circuit 56 while double-image disturbance is removed by the OR circuit 57.

Figure 12:
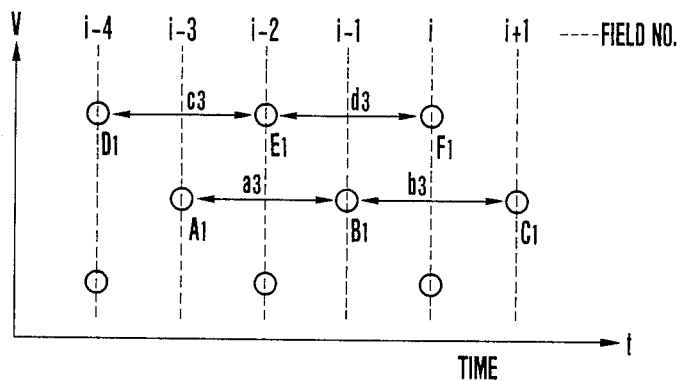
FIG. 12 shows the move of an image as in relation to an interpolation signal to be selected in the third embodiment.

The removal by the AND circuit 56 of a blurred image preceding a moving object's image is carried out in a manner as shown in FIG. 12. In FIG. 12, reference symbols A1, B1 and C1 denote signals representing the same or corresponding positions in different fields i−3, i−1 and i+1 as viewed on a picture plane while symbols D1, E1 and F1 denote corresponding signals of fields i−4, i−2 and i. In case that a move is arranged to be detected solely through a frame difference b2, the frame difference signal comes to show a significant difference when a move occurs in either the signal B1 or the signal C1. For example, if a move takes place in the signal C1 with the signal B1 at rest, inner-field interpolation would be selected to cause a blurred image preceding the moving object's image while the signal B1 should be selected in that instances an interpolation signal for the field i.

To solve this problem, therefore, the circuit of FIG. 11 is arranged to check for the presence or absence of any move in the signal B1. For example, if both the signals A1 and B1 are at rest while the signal C1 alone has a movement, a significant difference appears only in the frame difference b3 and not in the frame difference a3. If the signal B1 has a move, significant differences take place in both the frame differences a3 and b3. In other words, considering a case where a significant difference arises in the frame difference in terms of positive logic, the move M3 (assuming the move to be in positive logic) in the signal of the preceding field to be used for interpolation can be expressed as follows:

$$M3 = a3 \cdot b3$$

Therefore, the interpolation selection signal S35 can be expressed as follows from a logical sum of the signal S35 and th frame difference d3 for prevention of occurrence of a double image:

$$S35 = 33 \cdot b3 + d3$$

With the interpolation signal changed from one signal over to the other in accordance with this selection signal, any blurred image that precedes a moving object's image can be eliminated.

As for a blurred image following a moving object's image, the blurred image also can be removed by confirming the movement of the signal F1 of FIG. 12. For example, if the move takes place only in the signal F1 while both the signals D1 and E1 are at rest, no significant difference arises in the frame difference c3. However, if the signal E1 has a move, significant differences would arise in both the frame differences c3 and d3. In view of this, an interpolation selection signal S35' should be obtained as expressed below:

$$S35' = 33 \cdot b3 + c3.$$

Figure 13:
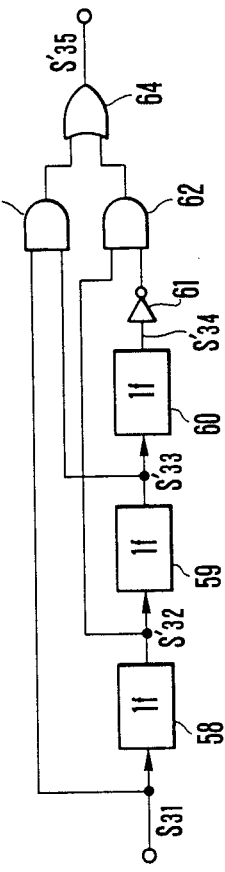
FIG. 13 shows another example of the details of the interpolation selection circuit of the third embodiment shown in FIG. 10.

An interpolation selection circuit which is capable of realizing the above concept is arranged as shown in FIG. 13. Referring to FIG. 13, a movement signal S31 is delayed to a degree corresponding to one field by each of one-field delay circuits 58, 59 and 60 one after another. The signal S31 thus becomes signals S32', S33' and S34' through these delay circuits. These movement signals S31, S32', S33' and S34' respectively correspond to the signals b3, d3, a3 and c3 of FIG. 12. The illustration includes a NOT circuit 61; AND circuits 62 and 63; and an OR circuit 64. The OR circuit 64 produces an interpolation selection signal which is in conformity to the formula of S35' mentioned in the foregoing.

Figure 14:
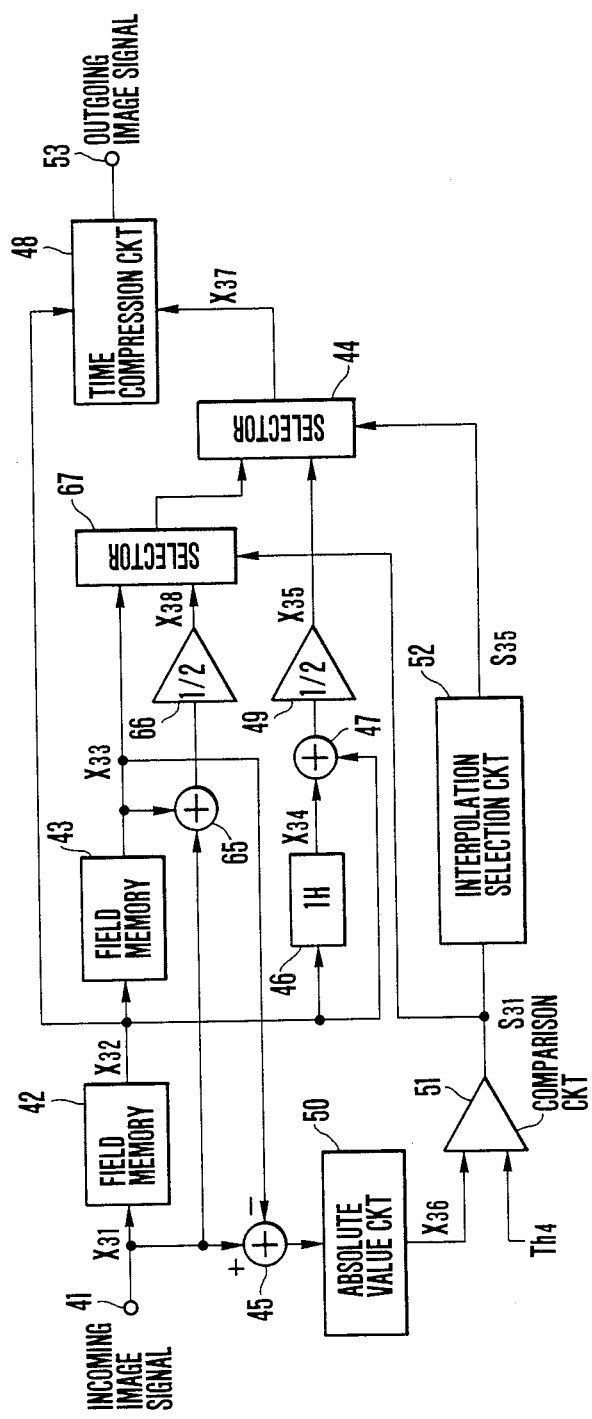
FIG. 14 is a block diagram showing a fourth embodiment of this invention.

FIG. 14 shows a fourth embodiment of this invention in a block diagram. The fourth embodiment is arranged to appropriately change the inter-field interpolation signal fame one signal over to another according to the movement signal S31. In FIG. 14, the same parts as those of FIG. 10 are indicated by the same reference simbols and numerals as FIG. 10. The following description covers the parts which differ from the parts arranged differently from those of FIG. 10. An adder 65 is arranged to obtain the sum of the incoming signal X31 and the signal X32 which is received one frame before the signal 31. The sum is multiplied by ½ by a ½ coefficient multiplying circuit 66. The output of the circuit 66 is applied to a selector 67. The selector 67 is arranged to select the signal X33 of the preceding field when the movement signal S31 is at an H level (the frame difference X33>Th4) or to select an average value X38 of the preceding and ensuing fields when the signal S31 is at an L level (the frame difference X36≦Th4). The arrangement is such that an average value of the signals B1 and C1 shown in FIG. 12 is employed as the interpolation signal when both the signals B1 and C1 are at rest and that the signal B1 is employed as the interpolation signal when the signal C1 has a move while the signal B1 is at rest. In case that the average value of the preceding and ensuing fields are employed as the interpolation signal, the S/N ratio is multiplied by $\sqrt{2}$ times. Therefore, this arrangement results in an improved S/N ratio of the images obtained through the scanning line conversion.

The third and fourth embodiments are arranged as described in the foregoing to be capable of giving a non-interlaced picture free from deterioration of picture quality, by eliminating the double image disturbance and a low degree of vertical resolution which follows a moving object's image.

Figure 15:
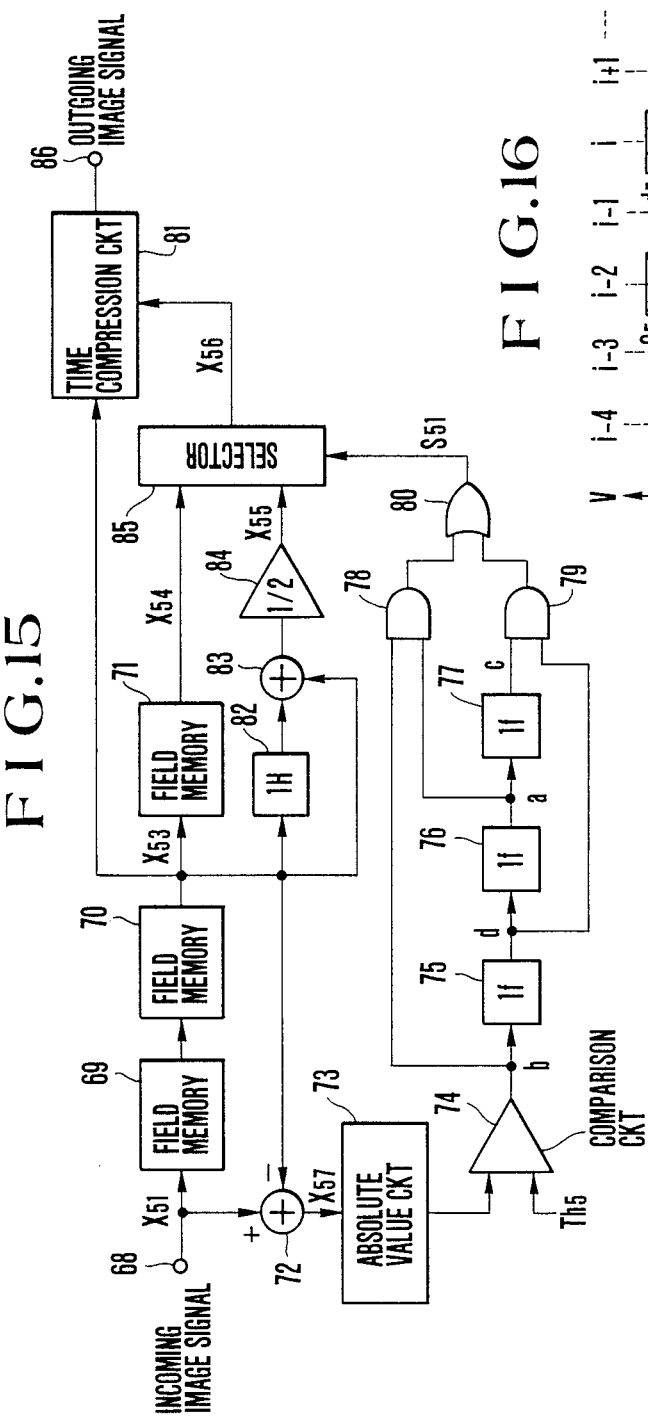
FIG. 15 is a block diagram showing a fifth embodiment of this invention.

A fifth embodiment of this invention is arranged as described below with reference to applicable drawings:

FIG. 15 shows the fifth embodiment in a block diagram. An incoming image signal X51 which is received at an input terminal 68 is delayed to a degree corresponding to one field by each of field memories 69, 70 and 71 one after another. The field memory 70 thus produces an image signal X53. The field memory 71 produces an image signal X54. A subtracter 72 is arranged to perform a subtracting operation on the image signal X51 and the image signal X53 which is received one frame before the signal X51. An absolute vale circuit 73 is arranged to obtain and supply the absolute value of the signal output X57 of the subtracter 72 to a comparison circuit 74. The circuit 74 compares the signal X57 with a threshold value Th5 and produces a movement signal at an H level when the signal X57 is larger than the threshold value Th5 and at an L level when the former is less than the latter. This movement signal is delayed to a degree corresponding to one field by each of one-field delay circuits 75, 76 and 77 one after another. An AND circuit 78 is arranged to obtain a logical product from the output of the comparison circuit 74 and that of the delay circuit 76. Another AND circuit 79 is arranged to obtain a logical product from the output of the AND circuit 79 and that of the delay circuit 77. An OR circuit 80 is arranged to obtain a logical sum from the outputs of the AND circuits 78 and 79. The OR circuit 80 produces an interpolation selection signal S51.

Meanwhile, the image signal X53 which is delayed to a total degree corresponding to one frame through the field memory 69 and 70 is applied to a time compression circuit 81 and also to a line memory 82 and an adder 83. The line memory 82, the adder 83 and a ½ coefficient multiplying circuit 84 are arranged to produce a signal representing the average value of the image signal X53 and the signal of an upper line. The average value signal thus obtained is supplied to the selector 85 as an inner-field interpolation signal X55. The selector 85 receives in the meantime also the signal X54 which is delayed to a degree corresponding to three fields from the field memory 71 as an inner-field interpolation signal X55. In accordance with the interpolation selection signal S51 from the OR circuit 80, the selector 85 selects either the inter-field interpolation signal X54 or the inner-field interpolation signal X55. The selected interpolation signal X56 is supplied to the time compression circuit 81. The time compression circuit 81 is arranged to compress to ½ the time base of the original signal X53 and that of the interpolation signal X56 from the selector 85. The circuit 81 then alternately supplies these signals X53 and X56 to an output terminal 86.

Figure 16:
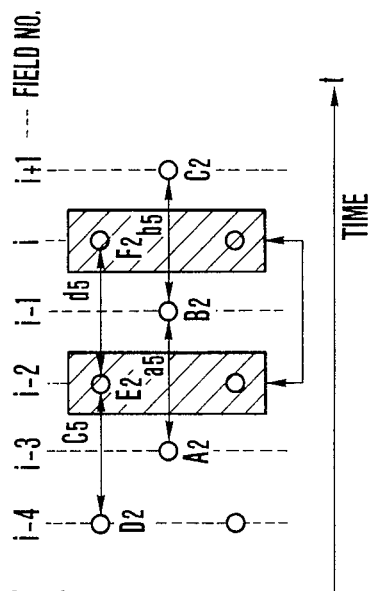
FIG. 16 shows the move of an image as in relation to movement signals a5, b5, c5 and d5 of the fifth embodiment.

Referring to FIG. 16, the movement signals a5, b5, c5 and d5 representing movement among consecutive fields respectively corresponds to the outputs or the delay circuit 76, the comparison circuit 74, the delay circuit 77 and the delay circuit 75.

The circuit of FIG. 15 operates as follows: In the case of this embodiment, the field memories 69, 70 and 71 are arranged in three steps for the incoming image signal X51. The field for which interpolation is to be made is shifted to a previous field. Interpolation for the field i−1 is determined as to whether it is to be inner-field interpolation or inter-field interpolation according to the movement signals a5, b5, c5 and d5 (see FIG. 16). In the case of FIGS. 15 and 16, the interpolation selection signal S51 (produced from the OR circuit 80) can be expressed as follows:

$$S51 = a5 \cdot b5 + c5 \cdot d5$$

In the above formula, the first term a5·b5 permits a discrimination between the presence and absence of any move at a point B2 in the field i−1 in question. The second term c5·d5 permits a discrimination between the presence and absence of a move at a point E2 at which selection of the inter-field interpolation signal is determined (see FIG. 16). Therefore, if there is a move at the point E2, inner-field interpolation is selected for the field i−1. This arrangement thus precludes any erroneous interpolation mentioned in the foregoing.

The embodiment illustrated is arranged to use the signal of corresponding point of a preceding field as the inter-field interpolation signal. However, this arrangement may be changed to use the average value of the preceding and ensuing fields. In the case of such modification, the inter-field interpolation signal can be selected according to the signal d5. More specifically, when the signal d5 is at an L level, both the preceding and ensuing fields (the fields i and i−2 in the case of FIG. 16) are at rest. In this instance, the average value of the preceding and ensuing fields is employed as the inter-field interpolation signal. The S/N ratio of this average value signal is improved by $\sqrt{2}$ times. Therefore, the S/N ratio of the interpolation signal can be improved by such arrangement.

The fifth embodiment, as described above, is not only capable of eliminating a double-image disturbance and a blurred image that follows the image of a moving object but also capable of selecting a pertinent interpolation signal, so that a very fine picture having no erroneous interpolation can be obtained.

What is claimed is:

1. An image signal conversion device for handling an interlaced image signal, whereby one frame picture plane is formed by multiplexing, in a time sharing manner, a plurality of field image signals corresponding to a plurality of field picture planes consisting of horizontal scanning lines located in different positions from each other on a picture plane, said device being arranged to form a high resolution image signal by increasing the number of horizontal scanning line signals constituting each of the field image signals, said device comprising:
   (a) inner-field interpolation signal forming means arranged to receive said interlaced image signal and, with a given field image signal of said interlaced image signal assumed to be a first field image signal, to use said first field image signal for forming an inner-field interpolation signal for the first field image signal;
   (b) inter-field interpolation signal forming means arranged to receive said interlaced image signal and to form an inter-field interpolation signal for said first field image signal by using at least a second field image signal which is received prior to said first field image signal within said interlaced image signal and is adjacent to said first field image signal;

(c) selective output means arranged to select and produce either said inner-field interpolation signal formed by said inner-field interpolation signal forming means or said inter-field interpolation signal formed by said inter-field interpolation signal forming means;

(d) control means for controlling said selective output means by using at least said first and second field image signals; and (e) image signal forming means for forming a high resolution image signal b interpolating said interlaced image signal with said interpolation signal produced from said selective output means.

2. A device according to claim 1, wherein said image signal forming means is arranged to receive said interlaced image signal through every horizontal scanning line signal thereof, to also receive said interpolation signal produced from said selective output means, to compress the time base of said horizontal scanning line signal and that of said interpolation signal respectively, to alternately produce the time-base compressed horizontal scanning line signal and the time-base compressed interpolation signal; and thus to form a high resolution image signal.

3. A device according to claim 1, wherein said inner-field interpolation signal forming means includes:

(a) a first extraction circuit arranged to extract, from said first field image signal, horizontal scanning line signals covering two adjacent lines; and (b) a first computing circuit arranged to produce, as said inner-field interpolation signal, an average value signal representing the average value of said horizontal scanning line signals of two lines extracted by said first extraction circuit.

4. A device according to claim 3, wherein said inter-field interpolation signal forming means includes a second extraction circuit which is arranged to extract, from among a plurality of horizontal scanning line signals within said second field image signal, a horizontal scanning line signal corresponding to a position located in between the two horizontal scanning lines covered by said scanning line signals of said first field image signal extracted by said first extraction circuit.

5. A device according to claim 4, wherein said control means includes:

(a) a subtraction circuit arranged to perform a subtracting operation on said horizontal scanning line signals of two lines extracted by said first extraction circuit and said horizontal scanning line signal which is extracted by said second extraction circuit and to obtain level differences of them;

(b) a comparison circuit arranged to compare said level differences obtained by said subtraction circuit with a preset threshold value respectively; and (c) an instruction circuit arranged to instruct said selective output means to produce said inner-field interpolation signal or said inter-field interpolation signal according to the result of comparison made by said comparison circuit.

6. A device according to claim 4, wherein said control circuit includes:

(a) a first comparison result detection circuit arranged to produce, for said second field image signal and a third field image signal which comes immediately after said first field image signal, the result of comparison between the horizontal scanning line signal which is extracted from said second field image signal by said second extraction circuit and a horizontal scanning line signal which is included in said third field image signal and corresponds to the horizontal scanning line signal extracted by said second extraction circuit;

(b) a second comparison result detection circuit arranged to produce, for said first field image signal and a fourth field image signal which immediately precedes said second field image signal, the result of comparison between horizontal scanning line signals which are included in said first and fourth field image signals and correspond to said horizontal scanning line signal extracted from said second field image signal by said second extraction circuit;

(c) a third comparison result detection circuit arranged to produce, for said second field image signal and a fifth field image signal which immediately precedes said fourth field image signal, the result of comparison between horizontal scanning line signal which is extracted from said second field image signal by said second extraction circuit and a horizontal scanning line signal which is included in said fifth field image signal and corresponds to the horizontal scanning line signal extracted by said second extraction circuit; and (d) an instruction circuit arranged to instruct said selective output means to selectively produce either the signal output of said first computing circuit or that of said second computing circuit in accordance with the results of comparison produced from said first, second and third comparison result detection circuits.

7. A device according to claim 4, wherein said control means includes:

(a) a first comparison result detection circuit arranged to produce, for said first field image signal and a third field image signal which comes immediately after said first field image signal, the result of comparison between a horizontal scanning line signal which corresponds to a lower part of a picture plane and is extracted from said first field image signal by said first extraction circuit and a horizontal scanning line signal which is included in said third field image signal and corresponds to said horizontal scanning line signal extracted by said first extraction circuit;

(b) a second comparison result detection circuit arranged to produce, for said second field image signal and a fourth field image signal which comes immediately after said first field image signal, the result of comparison between a horizontal scanning line signal extracted from said second field image signal by said second extraction circuit and a horizontal scanning line signal which is included in said fourth field image signal and corresponds to said horizontal scanning line signal extracted by said second extraction circuit;

(c) a third comparison result detection circuit arranged to produce, for said first field image signal and a fifth field image signal which precedes said first field image signal by two field periods, the result of comparison between a horizontal scanning line signal which is extracted from said first field image signal by said first extraction circuit and corresponds to the lower part of a picture plane and a horizontal scanning line signal which is included is said fifth field image signal and corresponds to said horizontal scanning line signal extracted by said first extraction circuit;

(d) a fourth comparison result detection circuit arranged to produce, for said second field image signal and a sixth field image signal which immediately precedes said fifth field image signal, the result of comparison between a horizontal scanning line signal which is extracted from said second field image signal by said second extraction circuit and a horizontal scanning line signal which is included in said fifth field image signal and corresponds to said horizontal scanning line signal extracted by said second extraction circuit; and (e) an instruction circuit arranged to supply an instruction signal to said selective output means to cause said selective output means to produce one of signal outputs of said first computing circuit and said second extraction circuit in accordance with the results of comparison produced from said first, second, third and fourth comparison result detection circuits.

8. A device according to claim 4, wherein said control circuit includes:

(a) a first comparison result detection circuit arranged to produce, for said second field image signal and a third field image signal which comes immediately after said first field image signal, the result of comparison between a horizontal scanning line signal which is extracted from said second field image signal by said second extraction circuit and a horizontal scanning line signal which is included in said third field image signal and corresponds to the horizontal scanning line signal extracted by said second extraction circuit;

(b) a second comparison result detection circuit arranged to produce, for said first field image signal and a fourth field image signal which immediately precedes said second field image signal, the result of comparison between horizontal scanning line signals which are included in said first and fourth field image signals and correspond to said horizontal scanning line signal extracted from said second field image signal by said second extraction circuit;

(c) a third comparison result detection circuit arranged to produce, for said second field image signal and a fifth field image signal which immediately precedes said fourth field image signal, the result of comparison between a horizontal scanning line signal which is extracted from said second field image signal by said second extraction circuit and a horizontal scanning line signal which is included in said fifth field image signal and corresponds to the horizontal scanning line signal extracted by said second extraction circuit;

(d) a fourth comparison result detection circuit arranged to produce, for said fourth field image signal and a sixth field image signal which immediately precedes said fifth field image signal, the result of comparison between horizontal scanning line signals which are included in said fourth and fifth field image signals and respectively correspond to said horizontal scanning line signal extracted from said second field image signal by said second extraction circuit; and (e) an instruction circuit arranged to instruct said selective output means to selectively produce either the signal output of said first computing circuit or that of said second extraction circuit in accordance with the results of comparison produced from said first, second, third and fourth comparison result detection circuits.

9. A device according to claim 8, wherein said instruction circuit includes an inverter which is arranged to invert the result of comparison produced from said fourth comparison result detection circuit; and said instruction circuit is arranged to supply said selective output means with an instruction signal which causes said selective output means to produce either the signal output of said first computing circuit or that of said second extraction circuit in accordance with the results of comparison produced from said first, second and third comparison result detection circuits and an inverted comparison result produced by said inverter.

10. A device according to claim 4, wherein said interfield interpolation signal forming means further includes:

(a) a third extraction circuit arranged to extract, from among a plurality of horizontal scanning line signals included in a third field image signal which comes immediately after said first field image signal, a horizontal scanning line signal corresponding to a position located in between the two lines of said horizontal scanning line signals of said first field image signal extracted by said first extraction circuit; and (b) a second computing circuit arranged to obtain an average value signal representing the average value of said horizontal scanning line signal extracted by said second extraction circuit and said horizontal scanning line signal extracted by said third extraction circuit.

11. A device according to claim 10, wherein said control means includes:

(a) a first subtraction circuit arranged to perform a subtracting operation on said two horizontal scanning line signals extracted by said first extraction circuit and said horizontal scanning line signal extracted by said second extraction circuit and to obtain level differences among them;

(b) a first comparison circuit arranged to compare each of the level differences obtained by said first subtraction circuit with a preset threshold value;

(c) a second subtraction circuit arranged to perform a subtracting operation on said two scanning line signals extracted by said first extraction circuit and said horizontal scanning line signal extracted by said third extraction circuit and to obtain level differences among them;

(d) a second comparison circuit arranged to compare each of said level differences obtained by the second subtraction circuit with a preset threshold value; and (e) an instruction circuit arranged to instruct said selective output means to select one of signals produced from said first computing circuit, said second computing circuit, said second extraction circuit and said third extraction circuit in accordance with the result of comparison made by said first comparison circuit and the result of comparison made by said second comparison circuit.

12. A device according to claim 10, wherein said control circuit includes:

(a) a first comparison result detection circuit arranged to produce, for said second field image signal and a third field image signal, the result of comparison between the horizontal scanning line signal extracted from said said second field image signal by said second extraction circuit and the horizontal scanning line signal extracted from said third field image signal by said third extraction circuit;

(b) a second comparison result detection circuit arranged to produce, for said first field image signal and a fourth field image signal which immediately precedes said second field image signal, the result of comparison between horizontal scanning line signals which are included in said first and fourth field image signals and correspond respectively to said horizontal scanning line signal extracted from said second field image signal by said second extraction circuit;

(c) a third comparison result detection circuit arranged to produce, for said second field image signal and a fifth field image signal which immediately precedes said fourth field image signal, the result of comparison between a horizontal scanning line signal which is extracted from said second field image signal by said second extraction circuit and a horizontal scanning line signal which is included in said fifth field image signal and corresponds to said horizontal scanning line signal extracted by said second extraction circuit; and (d) an instruction circuit arranged to instruct said selective output means to selectively produce one of the signal outputs of said first computing circuit, said second computing circuit and said second extraction circuit on the basis of the results of comparison produced from said first, second and third comparison result detection circuits.

13. An image signal conversion device for handling an interlaced image signal whereby one frame picture plane is formed by multiplexing, in an alternately time sharing manner, odd- and even-number field image signals which form said interlaced image signal and respectively correspond to odd- and even-number field picture planes consisting of horizontal scanning lines alternately located on a picture plane, said device being arranged to form a high resolution image signal by increasing the number of horizontal scanning line signals constituting each of said field image signals, said device comprising:

(a) inner-field interpolation signal forming means arranged to receive said interlaced image signal and, with a given field image signal of said interlaced image signal assumed to be a first field image signal to use the first field image signal for forming an inner-field interpolation signal for said first field image signal;

(b) inter-field interpolation signal forming means arranged to receive said interlaced image signal and to form an inter-field interpolation signal for said first field image signal by using at least one field length of a second field image signal which has horizontal scanning lines in different positions on a corresponding picture plane from said first field image signal;

(c) selective output means arranged to select and produce either said inner-field interpolation signal formed by said inner-field interpolation signal forming means or said inter-field interpolation signal formed by said inter-field interpolation signal forming means;

(d) control means for controlling said selective output means by using at least said first and second field image signals; and (e) image signal forming means for forming a high resolution image signal by interpolating said interlaced image signal with said interpolation signal produced from said selective output means.

14. A device according to claim 13, wherein said inner-field interpolation signal forming means includes:

(a) a first extraction circuit arranged to extract, form said first field image signal, horizontal scanning line signals covering two adjacent lines; and (b) a first computing circuit arranged to produce, as said inner-field interpolation signal, an average value signal representing the average value of said horizontal scanning line signals of two lines extracted by said first extraction circuit.

15. A device according to claim 14, wherein said inter-field interpolation signal forming means is arranged such that, of two field image signals which come before and after said first field image signal within said interlaced image signal and which have horizontal scanning lines differently located from those of said first field image signal on the corresponding picture plane, the field image signal preceding said first field image signal is assumed to be a second field image signal and the field image signal ensuing said first field image signal to be a third field image signal and that the inter-field interpolation signal is formed, for said first field image signal, by using at least one of said second and third field image signal.

16. A device according to claim 15, wherein said inter-field interpolation signal forming means includes:

(a) a second extraction circuit arranged to extract a horizontal scanning line signal which, among the plurality of horizontal scanning line signals of the second field image signal, corresponds to a position between the two scanning line signals of said first field image signal extracted by said first extraction circuit; and (b) a third extraction circuit arranged to extract a horizontal scanning line signal which, among the plurality of horizontal scanning line signals of the third field image signal, corresponds to a position between the two scanning line signals of said first field image signal extracted by said first extraction circuit.

17. A device according to claim 16, wherein said control circuit includes:

(a) a first comparison result detection circuit arranged to produce, for said second field image signal and a third field image signal, the result of comparison between a horizontal scanning line signal which is extracted from said second field image signal by said second extraction circuit and a horizontal scanning line signal which is extracted from said third field image signal by said third extraction circuit;

(b) a second comparison result detection circuit arranged to produce, for said first field image signal and a fourth field image signal which immediately precedes said second field image signal, the result of comparison between horizontal scanning line signals which are included in said first and fourth field image signals and correspond to said horizontal scanning line signal extracted from said second field image signal by said second extraction circuit;

(c) a third comparison result detection circuit arranged to produce, for said second field image signal and a fifth field image signal which immediately precedes said fourth field image signal, the result of comparison between a horizontal scanning line signal which is extracted from said second field image signal by said second extraction circuit and a horizontal scanning line signal which is included in said fifth field image signal and corresponds to the horizontal scanning line signal extracted by said second extraction circuit; and (d) an instruction circuit arranged to supply an instruction signal to said selective output means to instruct the latter to selectively produce either the signal output of said first computing circuit or that of said second extraction circuit in accordance with the results of comparison produced from said first, second and third comparison result detection circuits.

18. A device according to claim 16, wherein said control circuit includes:

(a) a first comparison result detection circuit arranged to produce, for said second field image signal and a third field image signal, the result of comparison between a horizontal scanning line signal which is extracted from said second field image signal by said second extraction circuit and a horizontal scanning line signal which is extracted from said third field image signal by said third extraction circuit;

(b) a second comparison result detection circuit arranged to produce, for said first field image signal and a fourth field image signal which immediately precedes said second image signal, the result of comparison between horizontal scanning line signals which are included in said first and fourth field image signals and correspond to said horizontal scanning line signal extracted from said second field image signal by said second extraction circuit;

(c) a third comparison result detection circuit arranged to produce, for said second field image signal and a fifth field image signal which immediately precedes said fourth field image signal, the result of comparison between a horizontal scanning line signal which is extracted from said second field image signal by said second extraction circuit and a horizontal scanning line signal which is included in said fifth field image signal and corresponds to the horizontal scanning line signal extracted by said second extraction circuit;

(d) a fourth comparison result detection circuit arranged to produce, for said fourth field image signal and a sixth field image signal which immediately precedes said fifth field image signal, the result of comparison between horizontal scanning line signals which are included in said fourth an fifth field image signals and respectively correspond to said horizontal scanning line signal extracted from said second field image signal by said second extraction circuit; and (e) an instruction circuit arranged to produce an instruction signal for instructing said selective output means to selectively produce either the signal output of said first computing circuit or that of said second extraction circuit in accordance with the results of comparison produced from said first, second, third and fourth comparison result detection circuits.

19. A device according to claim 18, wherein said instruction circuit includes an inverter which is arranged to invert the result of comparison produced from said fourth comparison result detection circuit; and said instruction circuit is arranged to produce said instruction signal to cause said selective output means to produce either the signal output of said first computing circuit and that of said second extraction circuit according to the results of comparison produced from said first, second and third comparison result detection circuit and the inverted result of comparison produced from said inverter.

20. A device according to claim 16, wherein said inter-field interpolation signal forming means further includes a second computing circuit which is arranged to compute and obtain an average value signal representing the average value of the horizontal scanning line signal extracted by said second extraction circuit and the horizontal scanning line signal which is extracted by said third extraction circuit.

21. A device according to claim 20, wherein said control circuit includes:

(a) a first comparison result detection circuit arranged to produce, for said second and third field image signals, the result of comparison between said horizontal scanning line signal which is extracted from said second field image signal by said second extraction circuit and said horizontal scanning line signal which is included in said third field image signal and is extracted therefrom by said third extraction circuit;

(b) a second comparison result detection circuit arranged to produce, for said first field image signal and a fourth field image signal which immediately precedes said second field image signal, the result of comparison between horizontal scanning line signals which are included in said first and fourth field image signals and correspond to said horizontal scanning line signal extracted from said second field image signal by said second extraction circuit;

(c) a third comparison result detection circuit arranged to produce, for said second field image signal and a fifth field image signal which immediately precedes said fourth field image signal, the result of comparison between a horizontal scanning line signal which is extracted from said second field image signal by said second extraction circuit and a horizontal scanning line signal which is included in said fifth field image signal and corresponds to said horizontal scanning line signal extracted by said second extraction circuit;

(d) an instruction circuit arranged to produce an instruction signal for instructing said selective output means to selectively produce one of the signal outputs of said first and second computing circuits and said second extraction circuit according to the results of comparison produced from said first, second and third comparison result detection circuits.

22. A device according to claim 21, wherein said selective output means includes:

(a) a first selection circuit arranged to produce either the signal output of said second computing circuit or that of said second extraction circuit on the basis of the result of comparison produced from said first comparison result detection circuit; and (b) a second selection circuit arranged to produce either the signal output of said first selection circuit or that of said computing circuit at least on the basis of the results of comparison produced from said first, second and third comparison result detection circuit.

23. An image signal conversion device for handling an interlaced image signal whereby one frame picture plane is formed by multiplexing, in an alternately time sharing manner, odd- and even-number field image signals which form said interlaced image signal and respectively correspond to odd- and even-number field picture planes consisting of horizontal scanning lines alternately located on a picture plane, said device being arranged to form a high resolution image signal by increasing the number of horizontal scanning line signals constituting each of said field image signals, said device comprising:

(a) inner field interpolation signal forming means arranged to receive said interlaced image signal, to use, as a first field image signal, a field image signal portion of said interlaced image signal received one frame period before a presently received field image signal portion for forming an inner-field interpolation signal for the first field image signal;

(b) inter-field interpolation signal forming means arranged to receive said interlaced image signal and to form an inter-field interpolation signal for said first field image signal by using a second field image signal which has horizontal scanning lines in different positions on a corresponding picture plane from said first field image signal;

(c) selective output means arranged to select and produce either the inner-field interpolation signal formed by said inner-field interpolation signal forming means or the inter-field interpolation signal formed by said inter-field interpolation signal forming means;

(d) control means for controlling said selective output means on the basis of at least said first and second field image signals; and (e) image signal forming means for forming a high resolution image signal by interpolating said interlaced image signal with the interpolation signal produced from said selective output means.

24. A device according to claim 23, wherein said inner-field interpolation signal forming means includes:

(a) a first extraction circuit arranged to extract, from said first field image signal, horizontal scanning line signals covering two adjacent lines; and (b) a first computing circuit arranged to produce, as said inner-field interpolation signal, an average value signal representing the average value of said horizontal scanning line signals of two lines extracted by said first extraction circuit.

25. A device according to claim 24, wherein said inter-field interpolation signal forming means includes a second extraction circuit arranged to extract, from among a plurality of horizontal scanning line signals of a field image signal which is included in the incoming interlaced image signal and has its horizontal scanning line signals differently positioned from those of said first field image signal on a corresponding picture plane, a horizontal scanning line signal corresponding to a position in between said two horizontal scanning line signals extracted from said first field image signal by said first extraction circuit.

26. A device according to claim 25, wherein said control means includes:

(a) a first comparison result detection circuit arranged to produce, for said first field image signal and a third field image signal which comes immediately after said first field image signal, the result of comparison between a horizontal scanning line signal which corresponds to a lower part of a picture plane and is extracted from said first field image signal by said first extraction circuit and a horizontal scanning line signal which is included in said third field image signal and corresponds to said horizontal scanning line signal extracted by said first extraction circuit;

(b) a second comparison result detection circuit arranged to produce, for said second field image signal and a fourth field image signal which comes immediately after said first field image signal, the result of comparison between a horizontal scanning line signal extracted from said second field image signal by said second extraction circuit and a horizontal scanning line signal which is included in said fourth field image signal and corresponds to said horizontal scanning line signal extracted by said second extraction circuit;

(c) a third comparison result detection circuit arranged to produce, for said first field image signal and a fifth field image signal which precedes said first field image signal by two field periods, the result of comparison between a horizontal scanning line signal which is extracted from said first field image signal by said first extraction circuit and corresponds to the lower part of a picture plane and a horizontal scanning line signal which is included in said fifth field image signal and corresponds to said horizontal scanning line signal extracted by said first extraction circuit;

(d) a fourth comparison result detection circuit arranged to produce, for said second field image signal and a sixth field image signal which immediately precedes said fifth field image signal, the result of comparison between a horizontal scanning line signal which is extracted from said second field image signal by said second extraction circuit and a horizontal scanning line signal which is included in said fifth field image signal and corresponds to said horizontal scanning line signal extracted by said second extraction circuit; and (e) an instruction circuit arranged to supply an instruction signal to said selective output means to cause said selective output means to produce either the signal output of said first computing circuit or that of said second extraction circuit in accordance with the results of comparison produced from said first, second, third and fourth comparison result detection circuits.

* * * * *

UNITED STATES PATENT AND TRADEMARK OFFICE
CERTIFICATE OF CORRECTION

PATENT NO. : 4,768,092

DATED : August 30, 1988

INVENTOR(S) : Hisashi Ishikawa

It is certified that error appears in the above-identified patent and that said Letters Patent is hereby corrected as shown below:

Col. 1, lines 57-58, change "Therefore, the inner-field Meanwhile, interpolation is selected in this instance. There arises no significant" to -- Therefore, the inner-field interpolation is selected in this instance. Meanwhile, there arises no significant --.

Col. 2, line 17, after "object", insert -- , --.

Col. 5, line 45, change "S11" to -- X11 --.

Col. 5, line 63, change "a" to -- as --.

Col. 7, line 47, change "eve" to -- even --.

Col. 10, line 25, change the formula to read $S35'=33.63+d3.\bar{c}3$.

Col. 10, line 43, change "fame" to -- frame --.

Col. 11, line 20, change "vale" to -- value --.

Col. 13, line 11, change "b" to -- by --.

Col. 19, line 52, change "an" to -- and --.

Signed and Sealed this

Seventh Day of February, 1989

Attest:

DONALD J. QUIGG

Attesting Officer    Commissioner of Patents and Trademarks